United States Patent [19]

Howes et al.

[11] Patent Number: 4,726,395

[45] Date of Patent: Feb. 23, 1988

[54] FLEXIBLE GUIDE

[75] Inventors: Franklin J. Howes, Fort Wayne; Randall E. Ricker, Roanoke, both of Ind.

[73] Assignee: Kunkle Valve Company, Inc., Fort Wayne, Ind.

[21] Appl. No.: 476,235

[22] Filed: Mar. 17, 1983

[51] Int. Cl.$^4$ ............................ F16K 15/18; F16K 21/04
[52] U.S. Cl. ........................................ 137/469; 137/540; 251/337; 267/160; 267/162
[58] Field of Search ............... 267/158, 159, 160, 161, 267/162, 163; 251/337; 137/469, 540

[56] References Cited

U.S. PATENT DOCUMENTS

| | | | |
|---|---|---|---|
| 224,971 | 7/1941 | Mecorney. | |
| 558,456 | 8/1897 | Mathewson. | |
| 1,201,826 | 10/1916 | Iversen | 137/516.13 |
| 1,201,827 | 10/1916 | Iversen | 137/516.13 |
| 1,244,286 | 10/1917 | Breinl. | |
| 1,385,147 | 7/1921 | Prellwitz | 137/516.13 |
| 1,615,279 | 1/1927 | Iversen | 137/516.15 |
| 2,704,548 | 3/1955 | Ralston | 137/469 |
| 3,598,138 | 8/1971 | Hadley | 137/82 |
| 3,692,054 | 9/1972 | Buls et al. | 137/596.18 |
| 4,245,667 | 1/1981 | Braukmann | 137/493 |

FOREIGN PATENT DOCUMENTS

| | | |
|---|---|---|
| 0032346 | 12/1980 | European Pat. Off. . |
| 1165368 | 3/1964 | Fed. Rep. of Germany . |
| 1209377 | 1/1966 | Fed. Rep. of Germany . |
| 1450531 | 3/1972 | Fed. Rep. of Germany . |
| 1125618 | 11/1956 | France . |
| 640150 | 7/1950 | United Kingdom . |

Primary Examiner—Alan Cohan
Assistant Examiner—John Rivell
Attorney, Agent, or Firm—Jeffers, Hoffman & Niewyk

[57] ABSTRACT

A flexible beam arrangement functioning as a valve member guide in a pressure relief valve for maintaining proper alignment of a valve member and a valve seat is disclosed wherein one end of the flexible beam is affixed to a valve housing and the other end thereof is fixed to the valve member so that opening and closing of the valve is associated with a flexing of the beam, however sliding motion of the valve member relative to the guide is eliminated. This assures an accurate reseating of the valve member on the valve seat. In the preferred form the flexible beam is formed as a relatively flat disc with an outer peripheral portion being the one end that is fastened to the housing and a central portion being the other end which is fastened to the valve member. Fastening of the other end to the valve member may be accomplished by a shoulder and snap ring arrangement so that the valve member may rotate about its axis relative to the disc, however, axial valve movement requires flexing of the disc. The disc may be provided with a pair of nested oppositely facing C-shaped cutout sections to aid flexure thereof so that on valve opening and closing the valve member moves axially.

11 Claims, 3 Drawing Figures

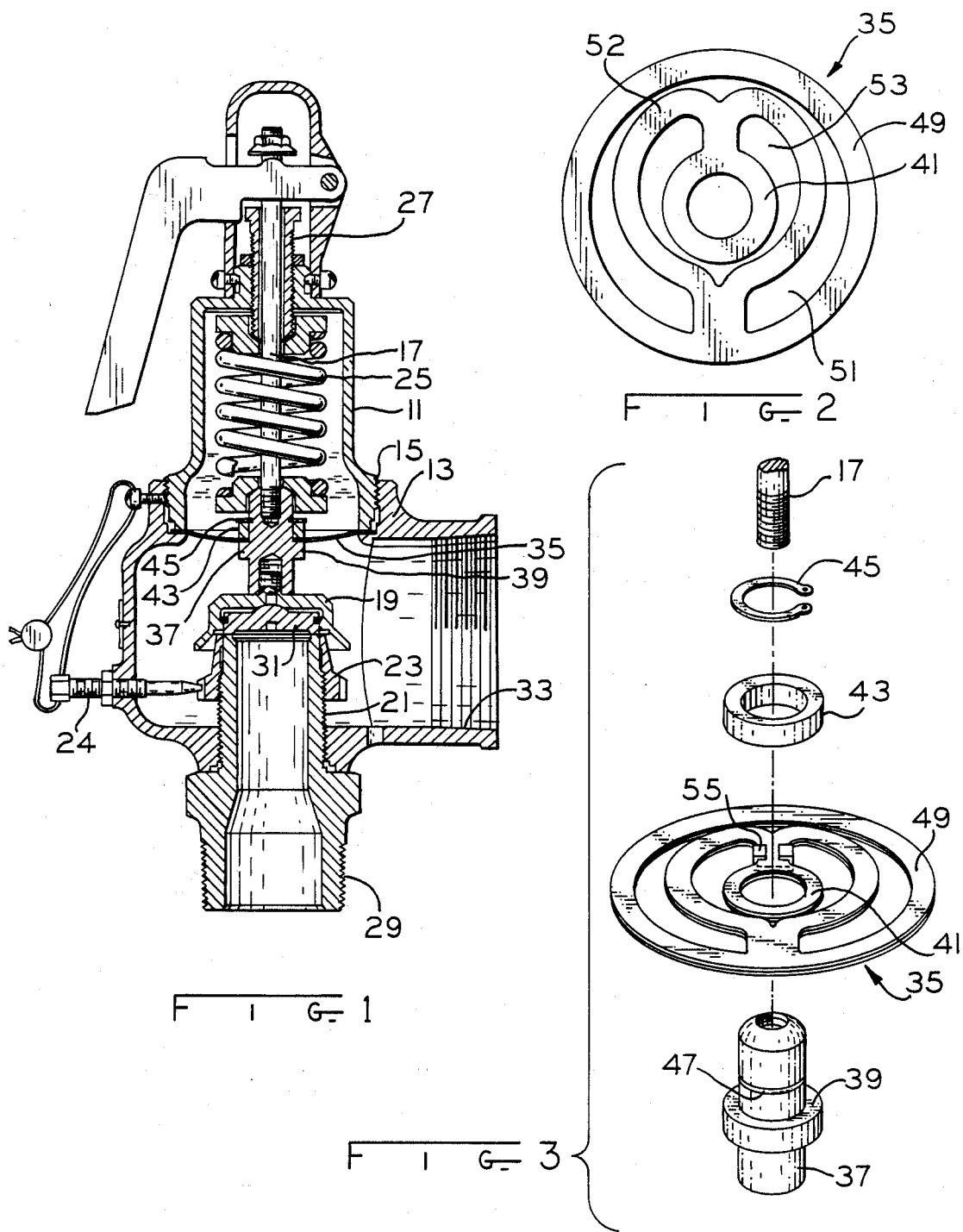

FLEXIBLE GUIDE

BACKGROUND OF THE INVENTION

The present invention relates generally to valving arrangements and more particularly to guides for one valve member in such a valving arrangement. Even more particularly, the present invention relates to valve member guides in the environment of pressure relief valves.

Pressure relief valves are old and well-known and may, for example, be employed in steam boiler or compressed air arrangements as a safety device and have found a widespread use in the petrochemical industry. Such valves are typically spring loaded to a closed position and, when the pressure in a specified region of the valve exceeds some preselected value, the valve opens venting that excess pressure to the atmosphere or elsewhere to prevent harmful explosions or system damage.

One such safety or relief valve currently manufactured by the applicants assignee has a valve seat fixed within a valve housing and a moveable stem supported valve member which is spring biased toward that valve seat with the valve stem sliding in a guide member as the valve opens and closes. This valve stem guide is a comparatively expensive component of the valve requiring an accurate sliding fit with the valve stem. The accumulation of dirt, corrosion or other accumulation of material on the valve stem, sometimes prevents or impedes the opening of the valve when in fact the valve should open to relieve pressure within the system.

It would be highly desirable to eliminate this sliding motion between a valve stem and a valve guide while retaining the ability to reseat the valve member accurately on the valve seat without use of a sliding guide mechanism.

In copending application Ser. No. 424,891, filed Sept. 28, 1982 now abandoned, there is disclosed a flexible guide for a valve member which in the preferred form has a central portion thereof captive between a pair of coaxial valve stem portions and having a series of spiral spokes coupling that central portion to a peripheral portion which is anchored to the valve housing. The arrangement of this copending application desirably eliminates sliding motion between the valve stem and stem guide with the valve stem executing a somewhat helical motion when actuated. This arrangement generally works well providing the desired results, however, in some installations, stress points have become excessively high. In some cases it would also be desirable for the length of the member interconnecting the inner and outer disc portions to be longer than that readily obtainable in a spiraling spoke design.

SUMMARY OF THE INVENTION

Among the several objects of the present invention may be noted the achieving of the above-noted desires; the provision of a valve member guide arrangement of reduced cost and enhanced reliability; the provision of a flexible beam valve member guide; and the provision of a valve member and guide arrangement which is free of any relative sliding motion. A specific object of the present invention is to obtain the benefits of the flexible guide disclosed in the aforementioned copending application while obviating the undesirable features thereof recited above. These, as well as other objects and advantageous features of the present invention, will be in part apparent and in part pointed out hereinafter.

In general, an improved valve member guide which is substantially friction free is formed as a circular flexible valve member guide having a central portion thereof axially captive along a valve stem in a rotationally free manner and a peripheral portion captive between engaged valve housing portions. The valve member guide is typically formed of a relatively thin circular sheet of spring material having a somewhat cardioid shaped arm spanning the inner portion and connecting that inner portion to the outer portion so that one portion may flex readily relative to the other. Thus, opening and closing of the valve is associated with flexure only of the beam like valve guide so that sliding motion of the valve stem relative to the guide is eliminated assuring accurate reseating of the valve member on a valve seat. In this configuration the valve member executes a fixed trajectory each time the valve opens and closes insuring a good sealing closure of the valve as well as repeatability of valve action.

BRIEF DESCRIPTION OF THE DRAWING

FIG. 1 is a view in cross-section of a pressure relief valve including the flexible beam valve stem guide of the present invention in one form thereof;

FIG. 2 is a plan view of a typical flexible beam of FIG. 1; and

FIG. 3 is an exploded perspective view illustrating a portion of the valve stem, flexible beam and beam mounting sleeve and snap ring as employed in FIG. 1 and further illustrating a variation on the flexible beam member.

Corresponding reference characters indicate corresponding parts throughout the several views of the drawing.

The exemplifications set out herein illustrate a preferred embodiment of the invention in one form thereof, and such exemplifications are not to be construed as limiting the scope of the disclosure or the scope of the invention in any manner.

DESCRIPTION OF THE PREFERRED EMBODIMENT

FIG. 1 illustrates the valve stem guide of the present invention in one form in the exemplary environment of a pressure relief valve of a type currently marketed by the applicants' assignee. Briefly, this known valve construction includes a first housing portion 11 and a second housing portion 13 threadedly joined at 15 along an axis generally coaxial with a valve stem or control rod 17. In the prior art pressure relief valve arrangement an inflexible disc having a central bushing was held captive between the housing portions 11 and 13 and a one-piece valve stem was slidably supported in that bushing. The valve stem supported valve member 19 is biased for engagement with the upper annular valve seat of nozzle 21. Nozzle 21 threadedly supports a control or regulator ring 23 which may be moved up or down nozzle 21 and then held in a desired position by screw 24 so as to set the reclose pressure of the valve. Valve member 19 is biased toward the seat of nozzle 21 by a coil spring 25 and the valve opening pressure which is intimately related to the stress of spring 25 may be controlled by adjusting the pressure adjusting screw 27. Thus, the pressure in a line connected to the threaded coupling 29 against the disc 31 of valve member 19 is monitored, and when that pressure exceeds the force of spring 25 urging the valve disc 31 against the valve seat, the valve opens venting that pressure by way of the outlet arrangement coupled to the threaded coupling 33. Proper alignment of the annular seat of nozzle 21 and disc 31 of the valve member 19 is critical to ensure sealing of the valve and this proper alignment as well as the elimination of any sliding motion within a bushing of a valve guide is achieved in the present invention by the use of a flexible beam member 35.

The flexible beam member 35 is analogus to a similar beam member bearing the same reference numeral in the aforementioned copending application, however in that earlier application the beam member and valve stem 37 were rigidly coupled together so that any rotational motion transmitted by way of shaft 17 during valve adjustment resulted in a torque being applied to the beam or beam member 35. A rotationally free coupling between the improved beam member 35 of the present application and valve stem 37 is achieved by the snap ring assembly process illustrated in FIG. 3.

In FIG. 3 valve stem 37 is seen to include a shoulder 39 so that the inner or central portion 41 of the disc or beam member 35 may be passed over the upper end of the valve stem and come to rest on shoulder 39. A bushing or sleeve 43 is then similarly slid down over the upper end of valve stem 37 and finally the C-shaped spring or snap ring 45 is spread and placed in slot 47 so as to capture the inner or central portion 41 of the beam between shoulder 39 and sleeve 43 as illustrated in FIG. 1. In some cases shoulder 39 may comprise a similar snap ring arrangement and other variations are easily seen.

Flexible beam 35 is seen to comprise a circular flexible valve member guide having generally concentric inner and outer portions 41 and 49 with inner portion 41 coupled to valve stem 39 in an axially fixed but rotationally free manner while the outer or peripheral portion 49 is gripped between housing portions 11 and 13 with optionally an annular washer interposed between those housing portions to properly position the guide 35 as well as to prevent damage thereto during assembly. The valve member guide 35 is formed of a relatively thin circular sheet of spring material and has a pair of nested oppositely facing C-shaped cutout portions 51 and 53 leaving a somewhat cardioid shaped flexible interconnection 52 between central portion 41 and peripheral portion 49. This interconnection between the two portions has, as seen in FIG. 2, bilateral symmetry about a vertical line with the effective length of the arm 52 coupling portions 41 and 49 together being at least double and perhaps four or five times that which would be achieved by a bridging portion of metal directly interconnecting these two concentric portions. The valve guide 35 thus forms a flexible beam with one end, namely the central portion 41 of the disc, axially fixed to the valve stem 39 and with the other end thereof, namely, the peripheral portion 49, fastened to the housing 11 and 13.

When the valve is closed, beam 35 is flexed somewhat downwardly as illustrated in FIG. 1, and when the pressure in the line attached to fitting 29 exceeds the preset value, this pressure causes disc 31 to raise off the seat of nozzle 21 against the force of coil spring 25 and flexing the disc 35 through its neutral or a flat position and somewhat upwardly. Since rotation between the housing and the outer peripheral portion of disc 35 is prevented due to the clamping together of the housing portions 11 and 13 while rotation between the valve stem 39 and the central portion 41 of disc 35 may freely occur the angular orientation of the disc 35 within the valve remains fixed while the beam flexes to allow opening and closing motion of the valve assuring accurate closing of the valve while not restricting the angular orientation thereof.

While the disc 35 of FIG. 3 has been described as being the same disc as illustrated in FIGS. 1 and 2, FIG. 3 actually introduces a slight variation on the disc structure which may be employed when a comparatively thick disc or guide is desired without introducing excessive spring biasing effects associated therewith. Disk 35 of FIG. 3 is actually formed from two identical disks joined together for example by cleat 55, thus disc 35 of FIG. 3 is twice the thickness of a single disc and therefor has twice the spring force of a single disc. Were disc 35 to have been formed from the same type material but of a thickness double that of the earlier discussed discs, the spring forces associated with that thicker disc would be substantially greater than double. Thus, by stacking disks the relationship between spring force and thickness becomes nearly linear while simply employing thicker material results in a relationship between spring force and thickness where the force increases as the cube of thickness.

From the foregoing it is now apparent that a novel valve stem guide arrangement has been disclosed meeting the objects and advantageous features set out hereinbefore as well as others. Numerous modifications will readily suggest themselves to those of ordinary skill in the art. For example, features set forth in the aforementioned copending application may be readily interchanged with features set forth in the present application as desired for any particular valve design, the spaced double guide member arrangement being particularly desirable. These as well as other modifications as to the precise configurations, shapes and details may be made by those have ordinary skill in the art without departing from the spirit of the invention or the scope thereof as set out by the claims which follow.

What is claimed is:

1. In a pressure relief valve of the type having first and second housing portions joinable along an axis, a nozzle having an annular valve seat at one end with in the housing and aligned with the axis, a valve member for sealingly engaging the valve seat and having a stem extending along the axis away from the nozzle, and means biasing the valve member into engagement with the seat, the improvement wherein the stem includes a shoulder and further comprising a circular flexible valve member guide having a generally circular peripheral portion thereof captive between the housing portions and a generally circular central portion thereof connected to the stem shoulder so as to be axially captive and rotationally free relative to the valve stem, a flexible arm being bilaterally symmetric about a median axis of the guide, said arm being connected to the central and peripheral portions along the median axis of the guide.

2. The improvement of claim 1 wherein the valve member guide comprises a relatively thin circular sheet of spring material.

3. The improvement of claim 1 further comprising a second circular flexible valve member guide having a central position connected to the stem so as to be axially captive and rotationally free relative to the valve stem, and a peripheral portion captive between the housing portions.

4. The improvement of claim 3 wherein the second circular flexible valve member guide and said circular flexible valve member guide are positioned immediately adjacent one another.

5. In a pressure relief valve having a valve member movable within a valve housing and spring biased toward a valve seat within the housing, an improved valve member guide for maintaining proper alignment of the valve member and valve seat comprising flexible beam means having generally concentric inner and outer portions with the outer portion fixed to the housing and the inner portion fastened to the member of the valve and with an integral arm portion interconnecting an inner edge segment of the outer concentric portion and a generally diametrically opposite outer edge segment of the inner concentric portion wherein opening and closing of the valve is associated with flexure only of the beam means thereby eliminating sliding motion of the member relative to the guide and assuring accurate reseating of the valve member and valve seat.

6. The improvement of claim 5 wherein the beam means is of one piece construction, the flexure of the beam means comprising primarily deformation of the arm portion.

7. The improvement of claim 5 wherein the beam means comprises a relatively thin circular sheet of spring material having a bilaterally symmetric arm extending between the inner and outer portions.

8. The improvement of claim 5 wherein the beam means comprises a relatively thin circular sheet of spring material with a pair of nested oppositely facing C-shaped cut out portions intermediate the inner and outer portions thereof.

9. The improvement of claim 5 wherein said arm portion is bilaterally symmetrical about a median axis of the guide, and said outer and inner concentric portions being interconnected along the median axis of the guide.

10. The improvement of claim 5 wherein said arm portion surrounds said inner concentric portion, and said outer concentric portion surrounds said arm.

11. In a pressure relief valve having a stem supported valve member movable within a valve housing and spring biased toward a valve seat within the housing, an improved valve stem guide for maintaining proper alignment of the valve member and valve seat comprising a one-piece flexible disc having generally concentric inner and outer portions joined along the median axis of the disc by a generally cardiod-shaped arm that is bilaterally symmetrical about the median axis, said arm being intermediate of said inner and outer portions, and said outer portion fixed to the valve housing and said inner portion being attached to the valve stem so as to couple a region of the stem to a region of the housing in a slide-free manner while allowing limited movement of the valve member relative to the valve seat, the arm having an effective length at least double the distance between the regions.

* * * * *